//==>

United States Patent [19]
Hurlbert

[11] 3,721,406
[45] March 20, 1973

[54] AIRCRAFT WING AIRFLOW CONTROL SYSTEM

[75] Inventor: Clifford F. Hurlbert, Bellevue, Wash.

[73] Assignee: The Boeing Company, Seattle, Wash.

[22] Filed: Dec. 14, 1970

[21] Appl. No.: 97,632

[52] U.S. Cl.........244/42 D, 244/42 DA, 244/42 DB, 244/42 DC, 244/53, 244/110 B
[51] Int. Cl..................................................B64c 9/18
[58] Field of Search ..244/42 C, 42 R, 42 CB, 42 CC, 244/42 CD, 42 CF, 42 CE, 53

[56] References Cited

UNITED STATES PATENTS

| | | | |
|---|---|---|---|
| 3,281,095 | 10/1966 | Runge | 244/42 C |
| 2,587,359 | 2/1952 | Milans | 244/42 C |
| 2,987,277 | 6/1961 | Richardson | 244/42 C X |
| 2,213,791 | 9/1940 | Zap | 244/42 CB |

*Primary Examiner*—Milton Buchler
*Assistant Examiner*—S. D. Basinger
*Attorney*—Glenn Orlob, Kenneth W. Thomas and Bernard A. Donahue

[57] ABSTRACT

A system for controlling flow through a passageway located in the aft 30 percent chord region of an aircraft wing airfoil to change the aerodynamic flow pattern during ground roll conditions, and thereby spoil lift, generate a downwardly acting force to increase the effective aircraft weight on the wheels, increase drag, and create thrust reversal by redirection of engine exhaust gases. The preferred embodiments involve unique flap means which may be actuated into position to intercept flow beneath the wing and turn the flow upwardly through the passageway. Disclosed flap members include a modified Fowler flap with provision for increased rotation forwardly to an acute angle with respect to the wing, and several optional cascade vane flap devices. An improved spoiler member incorporating an aft facing convex surface is also presented.

10 Claims, 17 Drawing Figures

INVENTOR.
CLIFFORD F. HURLBERT
BY
ATTORNEY

INVENTOR.
CLIFFORD F. HURLBERT
BY
ATTORNEY

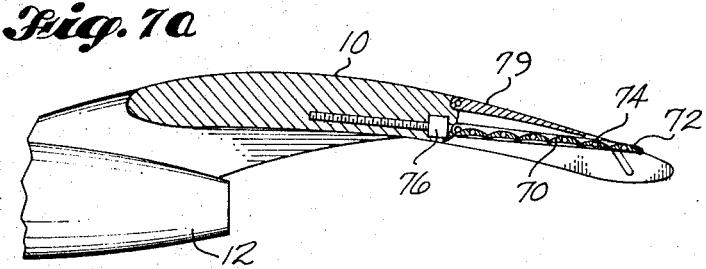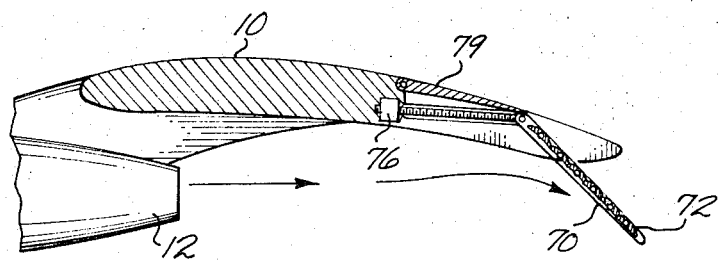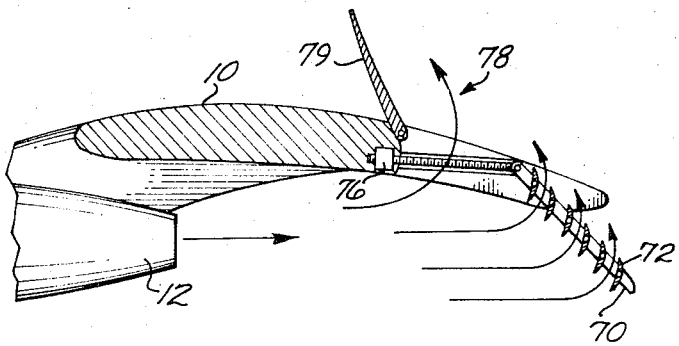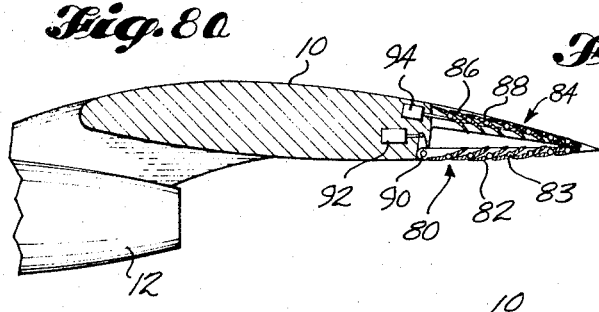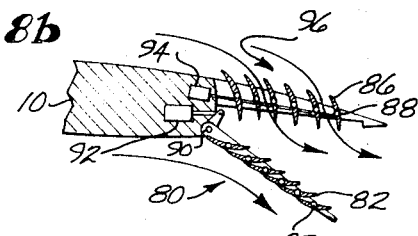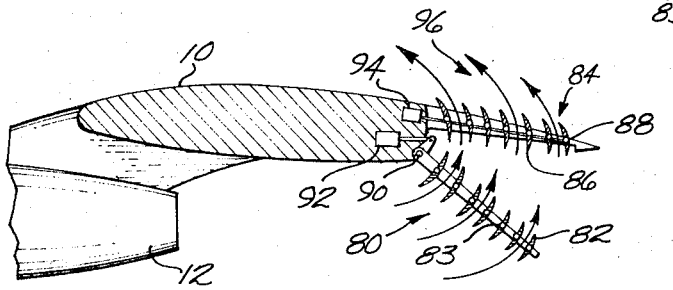

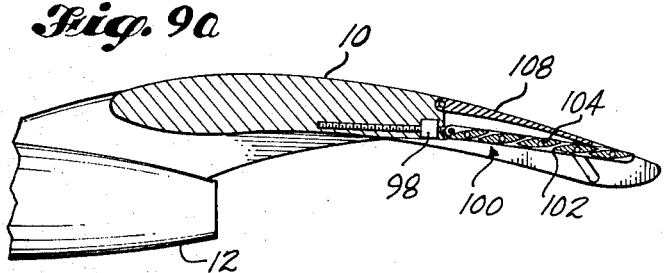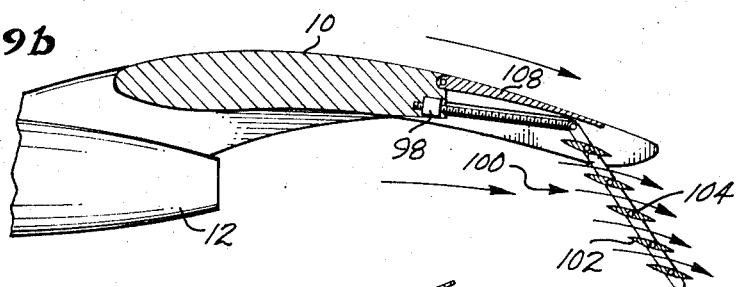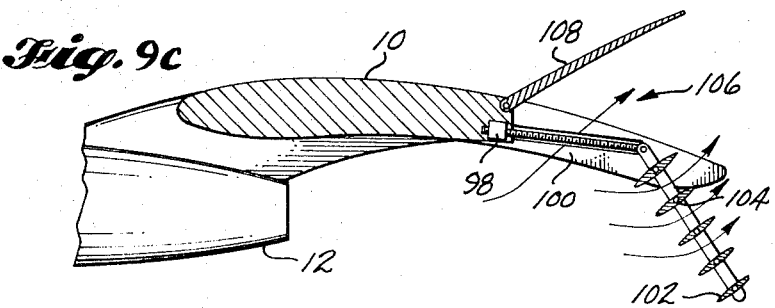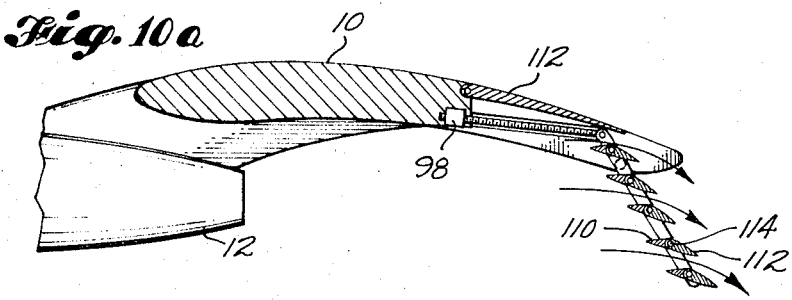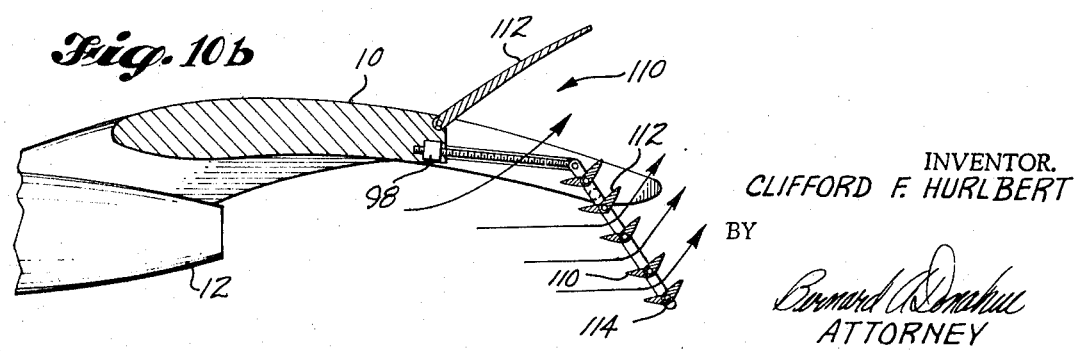

AIRCRAFT WING AIRFLOW CONTROL SYSTEM

FIELD OF THE INVENTION

The present invention relates to airflow deflection, and, more particularly, to an airplane wing flow control system which deflects airflow and changes the flow circulation pattern around the wing to thereby selectively increase or decrease the aerodynamic lift and drag during landing conditions. Additionally, in aircraft having jet propulsion engines mounted adjacent to the wing, the deflector system can be used to turn engine exhaust gases forwardly to obtain reverse thrust.

BACKGROUND OF THE INVENTION

The landing roll distance of an airplane is a function of the landing speed and the applied retarding forces tending to decelerate the airplane. The retarding forces consist principally of wheel braking force, aerodynamic drag, and reverse thrust. The wheel braking force depends on the tire-to-runway friction coefficient ($f$), and on the airplane weight (W) on the wheels. On runways covered with ice or standing water, the friction coefficient between the tires and the ground will be very small, resulting in a minimum available braking force. The effective airplane weight imposed on the landing wheels is diminished by the lift (L) of the wing and the actual braking force is computed as follows: $F_b = f(W-AW)$. Therefore, whenever the friction coefficient is small, or the lift has a large value, the available braking force may be lower than desired for safe landing conditions.

An airplane flying close to the ground or rolling along the ground, as in landing or takeoff, derives additional lift ($L$) from the well known ground effect phenomenon, which is an entrapment of air between the wing and the ground altering the ambient circulation about the airplane wing to produce an upward lifting pressure differential. A conventional wing lift spoiler nullifies the lift on the major wing section but only partially affects the lift of an extended wing flap. If the flaps are retracted to reduce the lift, the retarding force due to drag is also decreased. The end result is a residual lift which degrades wheel braking force during the landing roll.

The kinetic energy of the airplane that must be dissipated during the landing roll is a function of the airplane gross weight and the square of its landing velocity. The allowable minimum landing velocity can be decreased by increasing the lift coefficient of the wing with an extension of wing flaps, and also by deflecting the thrust of the engine downwardly either directly or by the wing flaps to augment wing lift by induced circulation.

The basic improvement of the present invention resides in shortening the landing roll distance of an airplane by a wing airflow control means which functions to decrease the minimum landing speed, to destroy lift and increase drag after landing, and to provide reverse thrust in a single coacting flow deflection system.

This invention applies to all conventional fixed-wing airplanes, irrespective of the type of propulsion used, and to nonpowered fixed-wing airplanes or gliders. However, certain functions of the invention are enhanced by a wing-mounted propulsion system, particularly a jet-propulsion system which discharges propulsive gases below the lower surface of the wing.

OBJECTS OF THE INVENTION

A primary object of the present invention is to teach the use of an aircraft wing flap system which may be displaced into position to intercept flow beneath the lower surface of the wing and to force such flow upwardly through a cove passageway in the aft portion of the wing to decrease the wing lift after landing.

A related objective is to provide wing-mounted means for deflecting the exhaust stream of an aircraft jet engine downwardly during landing approach for increased wing lift by reaction and by augmenting freestream circulation; and, upon landing, to deflect the exhaust stream upwardly and forwardly through a passageway in the wing to produce a downward force and reverse thrust.

A further related objective is to relieve aircraft under-wing ground effect lifting pressures upon landing, by venting the under-wing freestream flow upwardly through a passageway in the aft 30 percent chord region of the wing.

Another object is to increase the effective drag of a spoiler member which is pivotally mounted on the upper wing surface near a forward edge of a passageway of the type described, by providing a convex aft facing surface on the spoiler member for the purpose of increasing the flow velocity and decreasing the static pressure over the aft side of the spoiler.

Another objective is to provide a cascade vane array mounted in the manner of a conventional Fowler flap to obtain lifting flap performance with the cascade vane assembly in a closed position, and to rotate the vanes to open positions to allow passage of air after landing, to thereby destroy lift and increase drag.

A further related objective is to provide improved split flap aerodynamic lift performance by actuating a movable cascade vane assembly with the vanes closed to a position similar to that of the lower portion of a conventional split flap, and by utilizing a fixed cascade located above the flap to deflect the upper wing freestream downwardly over the aft side of the movable cascade assembly for improved lift; and, upon landing, to open the movable cascade vane assembly to deflect the underwing freestream upwardly through the fixed cascade to destroy lift and increase drag.

SUMMARY OF THE INVENTION

The above objectives are achieved in this invention by controlling the flow of air through a passageway in the aft 30 percent chord region of an airfoil, thereby selectively changing the aerodynamic flow pattern around the airfoil. The flow of air is controlled by a functionally unique flap means which may be actuated into position to intercept lower surface air and direct it upwardly into the passageway. Spoiler members are used to control flow out of the passageway. The preferred embodiment utilizes a Fowler-type flap which is mounted for rotary movement into a position forming an acute angle with the basic airfoil to thereby intercept airflow below the wing and turn it upwardly into the passageway. Several optional cascade vane flap configurations are presented which will also accomplish this function. The preferred spoiler means utilizes a convex surface for flow control and increased drag.

BRIEF DESCRIPTION OF THE DRAWINGS

FIGS. 7a, 7b, and 7c show an optional louvered cascade vane flap embodiment of this invention in various stages of deployment.

FIGS. 8a, 8b, and 8c show an optional double cascade embodiment of this invention in various stages of deployment.

FIGS. 9a, 9b, and 9c show an optional cascade flap embodiment in which the cascade vanes each function as lifting flap members.

FIGS. 10a, and 10b show a flap embodiment of this invention which utilizes variable camber cascade vane members.

DESCRIPTION OF THE PREFERRED EMBODIMENT

Figure 1:
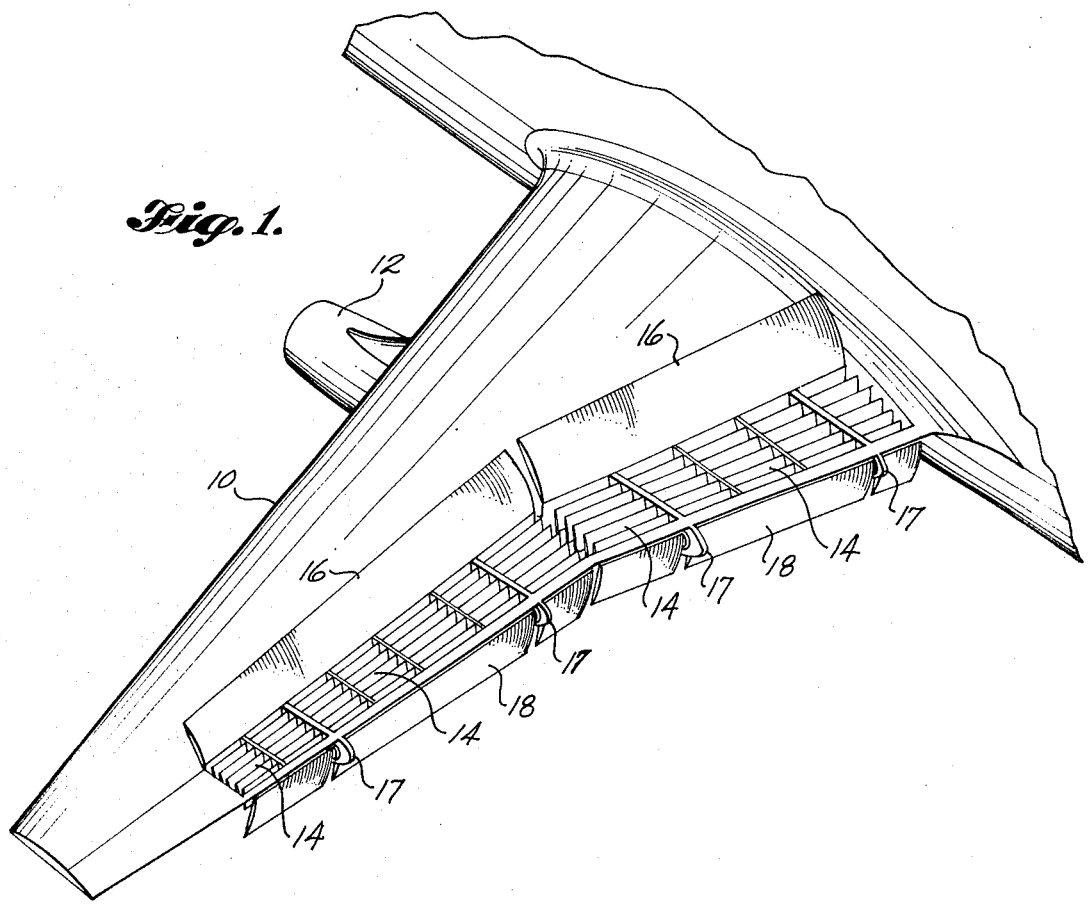
FIG. 1 depicts a typical wing airflow control system of the invention, extending substantially across the span of an aircraft wing.

FIG. 1 shows a typical aircraft wing embodiment of this invention. The flow control system occupies the tailing edge portion, or aft 30% chord region, of airplane wing 10 and extends substantially across the full span of the wing, including the region immediately behind jet propulsion engine 12. The system as shown is deployed in the landing roll position, to spoil lift and provide a downward acting force. A cascade vane assembly 14 is housed in the upper portion of the flap cove, with the spanwise axes of the vanes running generally parallel to that of the wing. Spoiler members 16 are pivotally mounted on the upper wing surface near the forward edge of the cascade vane assembly 14. Flap track supports are shown at 17. Flap members 18 are mounted for longitudinal and rotary motion.

Figure 2:
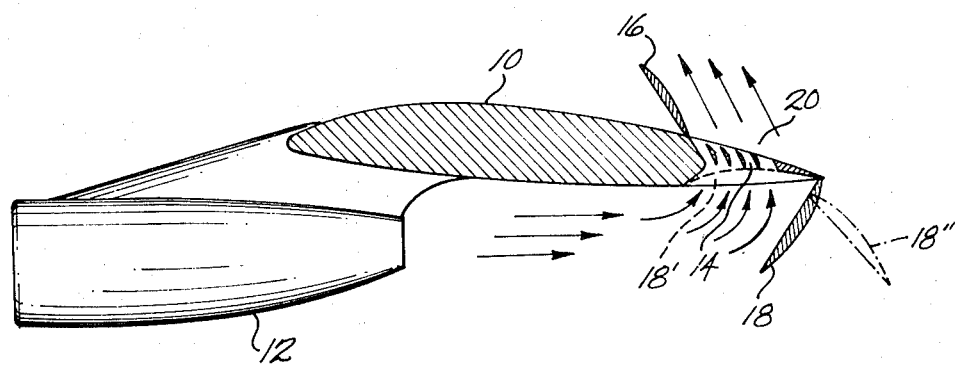
FIG. 2 is a cross-sectional showing of the airflow control system of FIG. 1.

FIG. 2 provides a cross-sectional view which illustrates the relative positions of the members of the flow control system during landing roll when it is desired to decrease lift, increase drag, and provide reverse flow circulation. Spoiler member 16 has been rotated forwardly through an angle exceeding 90° from its stowed position covering cascade vane assembly 14. The flap member 18 has been translated aft from its stowed or cruise position 18' to a lift flap position 18'' for landing approach, and then rotated forwardly to the solid line ground roll position. Note that an acute angle is established between the chord line of the flap and the chord line of the wing. This will cause the flap to intercept the free stream and exhaust gases flowing below the undersurface of the wing and direct them upwardly through a passageway 20 where the gases are turned forwardly by the cascade vanes 14. It will be apparent that the flow pattern shown in FIG. 2 will spoil lift on the wing, and establish forces which have components that act downwardly and aft to increase the effective aircraft weight on the wheels and to increase aircraft drag. Also, the portion of the flow control system located immediately behind the engine 12 will create thrust reversal by its redirection of the engine exhaust gases.

Figure 3:
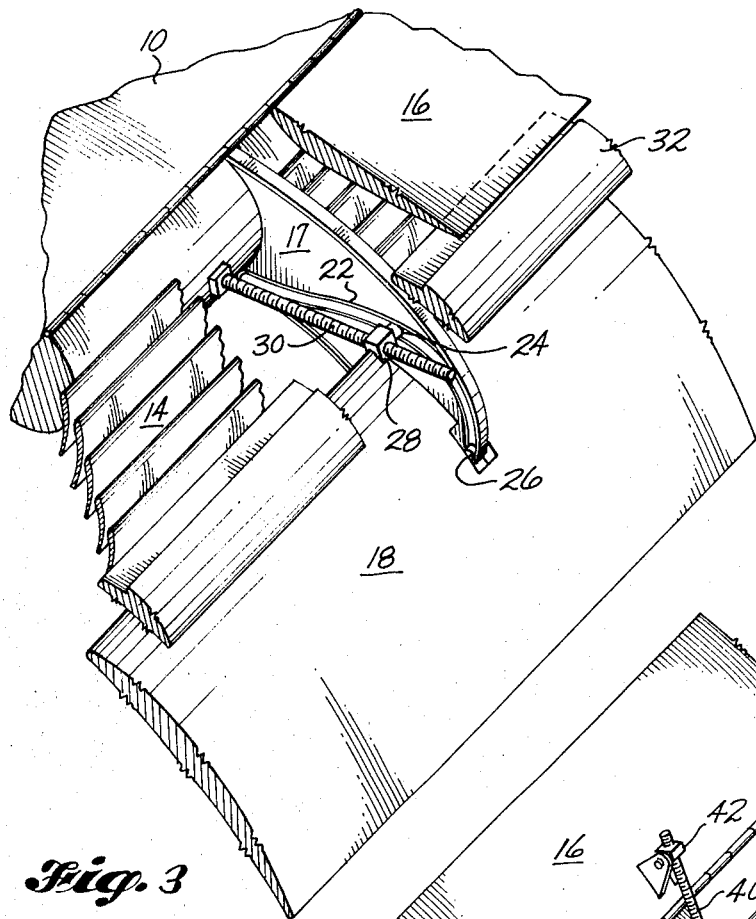
FIG. 3 is an expanded cutaway isometric view of the aft portion of the wing airfoil of FIG. 1, showing details of the flap actuation means in the landing approach mode.

The FIG. 3 isometric displays details of the flap actuation means, shown here in the flaps extended or landing approach mode. The flap track support 17 contains a hook-shaped flap track 22 which receives a flap forward retainer pin 24 and an aft retainer pin 26 thereby establishing the position of flap member 18. A traveling nut 28 is located between forward retainer pin 24 and flap member 18. Nut 28 is threadedly engaged with an externally threaded actuator screw shaft 30. Actuator means (not shown in FIG. 3) are employed to selectively rotate screw shaft 30 in either direction to move flap member 18 longitudinally along track 22. The relative position of retainer pins 24 and 26 is controlled by the contour of track 22 and will establish the angular displacement of the flap member 18. FIG. 3 shows spoiler member 16 in its stowed position over passageway 20, nested against a fixed trailing edge member 32.

Figure 4:
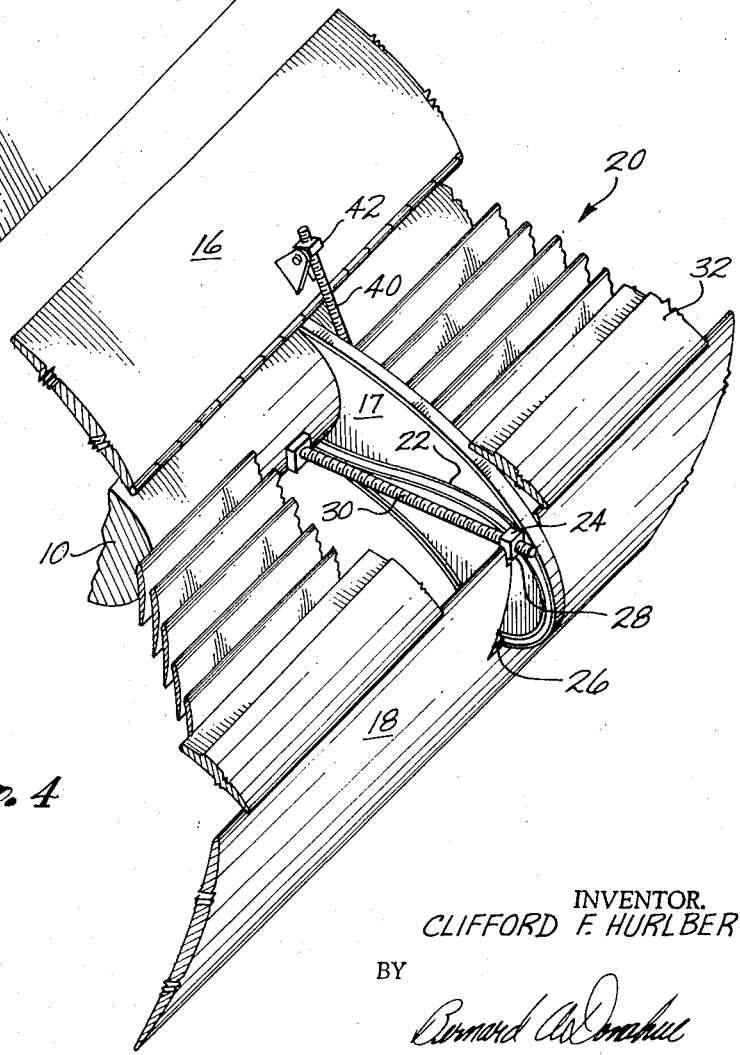
FIG. 4 is an isometric similar to FIG. 3 with the system deployed in the landing roll mode, showing details of the flap and spoiler actuation means.

FIG. 4 is an isometric view similar to FIG. 3 with the flap member 18 and spoiler member 16 fully deployed into their landing roll positions to spoil lift and create a downwardly directed force on the wing. The flap member 18 has been moved longitudinally along track 22 to a position wherein it forms an acute angle with respect to the undersurface of the wing 10 to thereby intercept flow beneath the wing and turn it upwardly into the passageway 20, through the cascade vanes 14, and upwardly and forwardly along the aft surface of spoiler member 16. The spoiler 16 is shown to have been deployed by spoiler actuation means comprising an actuator screw shaft 40 in combination with a pivotally mounted traveling nut 42. In a manner similar to that of the flap actuation means, the nut 42 is arranged to displace the spoiler upon rotation of screw shaft 40.

Figure 5:
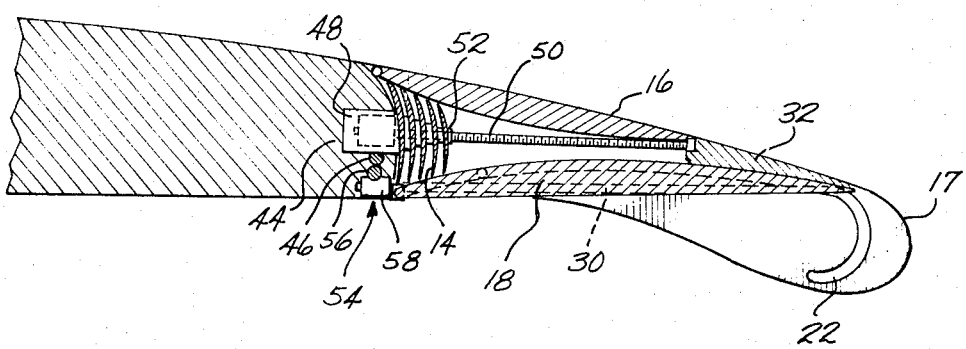
FIG. 5 is a cross-sectional view showing a stowable cascade embodiment of the flow control system, positioned for cruise flight.

FIG. 5 is a detailed showing of a movable cascade embodiment wherein the vane members are stowed in stacked positions within the trailing edge contour and deployed only during landing roll. The outer surfaces of spoiler member 16 and flap member 18 form the contours of the trailing edge of the wing. This embodiment may be used with very thin wing trailing edge sections because of the minimal stowed space of the cascade assembly. Vane members 14 are supported by a telescoping actuation means 44 which comprises a drive shaft 46, a gear box 48, an actuation screw shaft 50, and a single traveling nut 52 attached to the aft movable vane segment. Flap actuation means 54 includes a drive shaft 56, and a gear box 58 which are operably connected for selective rotation of the screw shaft 30 to position the flap 18.

Figure 6:
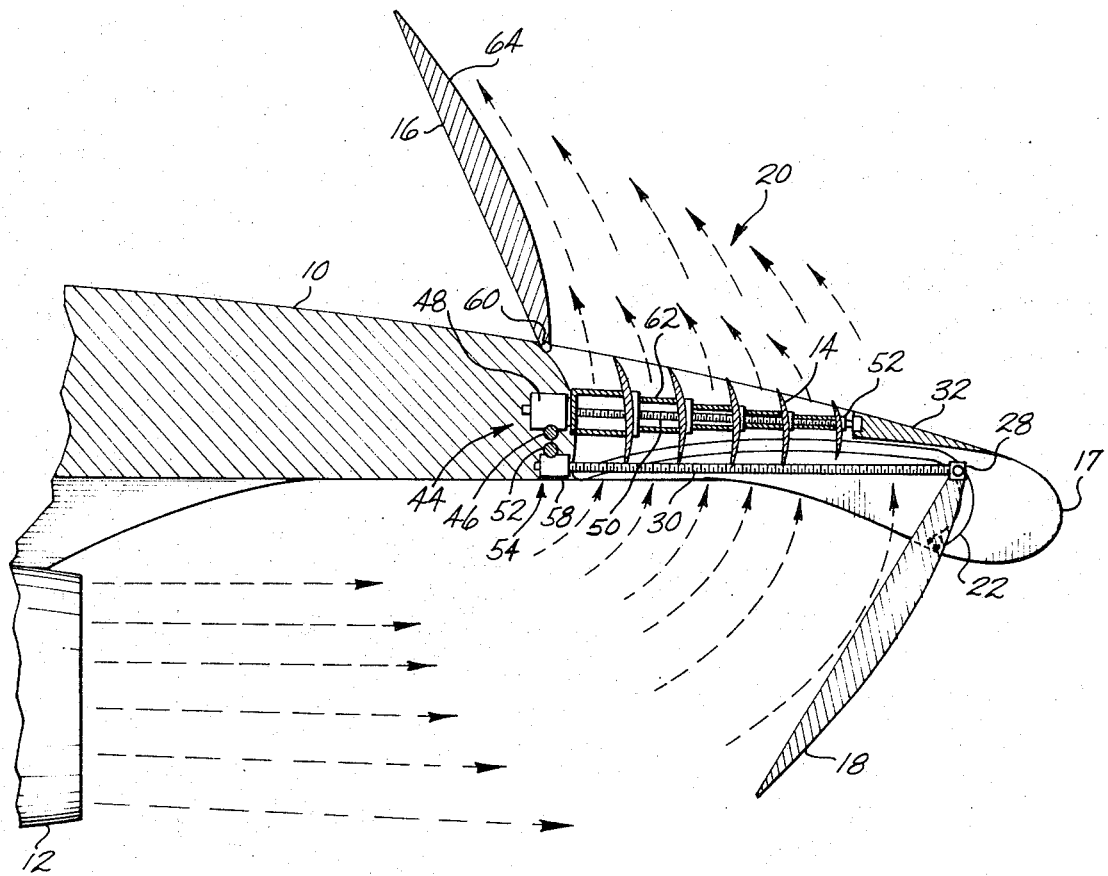
FIG. 6 is a cross-sectional view showing the flow control means of FIG. 5 in a deployed position for landing roll.

FIG. 6 shows the FIG. 5 movable cascade assembly deployed for landing roll operation. Flap member 18 has been displaced along track 22 past the landing approach position (18'' in FIG. 2) into the landing roll position shown here wherein the flap member 18 forms an acute angle with the undersurface of wing 10, thereby intercepting flow beneath the wing and turning it upwardly into passageway 20. The spoiler member 16 has been rotated more than 90° about hinge 60, located at the forward edge of passageway 20, to open the upper side of the passageway to flow from beneath the wing. The cascade assembly has been deployed across passageway 20 by the movement along shaft 50 of traveling nut 52 which causes the successive extension of the adjoining vane members as the telescoping sections 62 are each extended. The vane members 14 are shaped to turn the flow through passageway 20 forwardly over the aft surface 64 of spoiler 16. The spoiler 16 shown in FIG. 6 departs from a conventional spoiler in that the aft surface 64 is provided with a convex contour which increases the flow velocity over the surface and turns the upper regions of the flow in a forwardly direction. The convex contour at surface 64 reduces the static pressure acting on the aft side of the spoiler and, because of an increased pressure differential across the spoiler, will obtain improved drag characteristics over a conventional spoiler with a flat aft surface.

FIGS. 7 through 10 disclose several optional movable flap embodiments utilizing cascade vane arrays wherein each of the vane members are selectively rotatable to obtain results functionally similar to the acute angle Fowler flap embodiments of FIGS. 1–6. The cascade flap systems of FIG. 7 through 10 are each stowed for cruise flight within the contours of the wing trailing edge and may be actuated to a first position for conventional landing flap performance, and then into a second position for landing roll to vent ground effect pressures and turn flow beneath the wing upwardly to generate a downward force.

FIGS. 7a, 7b, and 7c show a cascade flap 70 in the stowed, landing flap, and ground roll positions, respectively. The cascade flap comprises individual vane members 72 which are each pivotally mounted at 74 along a spanwise axis. Actuation means 76 may be of a conventional ball screw type, similar to those discussed in connection with previous embodiments. The cascade assembly is movable from a stowed position within the contours of the trailing edge (FIG. 7a) to a landing approach position (FIG. 7b) wherein it functions as a conventional Fowler flap with the vane members remaining closed. Ground roll operation is obtained by rotating the cascade vanes about their spanwise axes by conventional cam actuation means (not shown) which are responsive to actuation means 76, change the vane angle and thereby direct the flow upwardly (FIG. 7c), and to cause under-wing flow to pass through a passageway 78, which has been opened by the rotation of a spoiler member 79.

FIGS. 8a, 8b, and 8c show a double cascade array embodiment in stowed, landing approach, and ground roll positions, respectively. FIG. 8a shows the system stowed for cruise flight, with a lower flap cascade assembly 80 comprising vanes 82 which are each pivotally mounted, as at 83, along a spanwise axis and are held in a closed position. The upper cascade assembly 84 similarly comprises vanes 86, pivotally mounted at points 88 and held closed for cruise flight. For the landing approach mode, shown in FIG. 8b, the flap cascade assembly 80 is rotated downwardly about point 90 by actuation means 92 to redirect flow in the manner of a conventional flap. The upper cascade vanes 86 are each rotated by actuation means 94 to open passageway 96 through the wing trailing edge. The vanes 86 direct flow downwardly over the aft surfaces of flap 80 to reduce static pressures thereon and further enhance lifting characteristics in the manner of a split flap. For the landing roll mode shown in FIG. 8c, the flap cascade vane members are each rotated about their spanwise axes 83, by a conventional camming device (not shown) of the actuation means 92, into open positions to redirect flow through the flap and upwardly into passageway 96, where the flow is turned forwardly by the upper cascade assembly 84. The flow pattern shown in FIG. 8c will, as in the previous embodiments, spoil lift on the wing, increase drag, vent the pressures on the undersurface of the wing, and, in the region behind engine 12, create thrust reversal by redirection of the exhaust gases.

FIGS. 9a, 9b, and 9c disclose still another optional embodiment of the invention in various stages of deployment. Actuation means 98, similar to those of previous embodiments, is used to deploy a cascade flap assembly 100 from the stowed position of FIG. 9a, to the lifting flap position of FIG. 9b. The cascade vane members 102 are each pivotally mounted at points 104 and are rotated into the open positions of FIG. 9b where they function as a series of individual lifting surfaces for landing approach. FIG. 9c shows the vane members 102 further rotated into positions for landing roll wherein they turn the flow beneath the wing upwardly to obtain a downwardly directed force and induce flow through a passageway 106 which has been opened by rotation of a spoiler member 108.

FIGS. 10a and 10b show a still further embodiment, similar to the FIG. 9 system, wherein each cascade flap vane member comprises a forward portion 110 and an aft portion 112 pivotally interconnected at 114 for independent actuation, to control flow by effectively varying the camber of each vane member. For the landing approach mode shown in FIG. 10a, the forward and aft portions 110 and 112 are positioned by a cam-actuated mechanism (not shown) to deflect flow downwardly for increased lift. FIG. 10b shows the aft portion 112 of each vane member rotated counterclockwise to change the camber of the vane to direct flow upwardly, and to induce flow through a passageway 110 which has been opened by rotation of a spoiler 112.

While several preferred forms of this invention have been described, other and obvious modifications and variations are possible in light of the disclosures made. For example, the screw shaft and travelling nut actuation means have been shown in all embodiments for simplicity in illustrating the invention. As is well known by persons skilled in this art, hydraulic or other actuation means may be substituted and will be preferred in specific design applications of this invention. Therefore, the invention should be considered to be limited only by the scope of the appended claims.

What is claimed is:

1. In an aircraft airflow control system, apparatus located within the aft 30 percent chord region of an horizontally extending airfoil, for selectively changing the aerodynamic flow pattern around the airfoil during landing approach and ground roll conditions comprising: structural means forming a passageway through the interior of said airfoil in said aft 30 percent chord region; spoiler means pivotally mounted on an upper surface of said airfoil and having a stowed position disposed over the upper opening of said passageway so as to prevent flow there through; flap means mounted on a lower surface of said airfoil and having a stowed position disposed over the lower opening of said passageway so as to prevent flow therethrough; positioning means for holding said spoiler means in its stowed position while translating said flap means to a lift flap position extending aft of and beneath said airfoil wherein said flap means will deflect the flow beneath the lower surface of said airfoil downwardly to thereby increase the aerodynamic lift acting on said aircraft, and for rotating said flap means from said lift flap position and said spoiler means from its stowed position to operative positions for ground roll wherein said flap means functions to turn the flow beneath the lower surface of said airfoil upwardly into said passageway and wherein said spoiler means functions to block the flow over the upper surface of said airfoil and allow upward flow through said passageway; whereby the upwardly directed flow into said passageway changes the flow pattern around said airfoil section to decrease the aerodynamic lift and increase the aerodynamic drag acting on said aircraft.

2. Apparatus according to claim 1 wherein said flap positioning means includes means for translating said flap means aft beyond the trailing edge of said airfoil into said lift flap position and for rotating said flap means into said operative position for ground roll wherein it forms an acute angle with respect to the undersurface of said airfoil section.

3. Apparatus according to claim 1 which includes cascade means mounted within said passageway, said cascade means comprising a plurality of individual vane members extending along the span of said airfoil for directing flow passing through said passageway.

4. Apparatus according to claim 3 wherein said vane members of said cascade means are each pivotally mounted about a spanwise axis and which includes vane positioning means for rotating said vane members from a stowed position blocking flow through said passageway to an operative position in which said vane members direct flow through said passageway.

5. Apparatus according to claim 3 wherein said individual vane members are each mounted on telescoping actuation means which functions to move said vane members from a stacked relationship in the forward region of said passageway to a spaced-apart relationship extending substantially across said passageway.

6. Apparatus according to claim 1 wherein said spoiler means is mounted near the forward edge of said passageway and is provided with an aft facing convex surface means for receiving flow from said passageway and for increasing local flow velocity to reduce static pressure over the aft side of said spoiler means.

7. Apparatus according to claim 1 wherein said flap means is pivotally mounted near its forward edge and comprises a plurality of cascade vane members which are each pivotally mounted about a spanwise axis, and said flap positioning means comprises vane positioning means for selectively rotating said vane members from positions blocking flow therebetween into positions allowing flow between said vane members.

8. Apparatus according to claim 7 wherein said flap positioning means includes linear actuation means and track means for rotating and translating said flap means aft with respect to said airfoil section.

9. Apparatus according to claim 8 wherein each of said cascade vane members comprises a forward portion and an aft portion which are pivotally interconnected, and wherein said vane positioning means comprises means for rotating said aft portion independently of said forward portion so as to effectively vary the camber of each of said vane members.

10. Apparatus located within the aft 30 percent chord region of a horizontally extending aircraft wing type airfoil, for selectively changing the aerodynamic flow pattern around the airfoil section comprising: structural means forming a passageway through the interior of said airfoil in said aft 30 percent chord region; cascade means mounted within said passageway and including a plurality of individual vane members extending along the span of said airfoil for directing flow passing through said passageway, said individual vane members being mounted on telescoping actuation means which moves vane members from a stacked relationship in the forward region of said passageway to a spaced-apart relationship extending substantially across said passageway; flap means pivotally mounted on a lower surface of said airfoil section and having a stowed position wherein said flap means is disposed over the lower opening of said passageway so as to prevent flow therethrough; flap positioning means for rotating said flap means from said stowed position to an operative position wherein said flap means functions to turn the flow beneath the lower surface of said airfoil section upwardly into said passageway; whereby the upwardly directed flow into said passageway changes the flow pattern around said airfoil section to decrease the aerodynamic lift of said airfoil.

* * * * *